(12) United States Patent
Tortora

(10) Patent No.: US 8,517,589 B2
(45) Date of Patent: Aug. 27, 2013

(54) LIGHTING SYSTEM FOR A DATA DISPLAY DEVICE INCLUDING A LIGHT GUIDE

(75) Inventor: Pierpasquale Tortora, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 113 days.

(21) Appl. No.: 13/151,052

(22) Filed: Jun. 1, 2011

(65) Prior Publication Data

US 2011/0299300 A1 Dec. 8, 2011

(30) Foreign Application Priority Data

Jun. 3, 2010 (EP) ..................................... 10164825

(51) Int. Cl.
*F21V 7/04* (2006.01)
(52) U.S. Cl.
USPC ......... 362/615; 362/97.1; 362/97.3; 362/621; 362/623
(58) Field of Classification Search
USPC ............... 362/551, 555, 560, 559, 97.1, 97.3, 362/615, 621, 623
See application file for complete search history.

(56) References Cited

U.S. PATENT DOCUMENTS 6,874,924 B1 * 4/2005 Hulse et al. .................... 362/551
2009/0167651 A1 7/2009 Minano et al.

FOREIGN PATENT DOCUMENTS

GB 2 324 599 A 10/1998
WO 2009/134573 A1 11/2009

OTHER PUBLICATIONS

Search Report issued in corresponding application EP 10164825, completed Oct. 26, 2010.

* cited by examiner

*Primary Examiner* — Ali Alavi
(74) *Attorney, Agent, or Firm* — Griffin & Szipl, P.C.

(57) ABSTRACT

Lighting system for a data display device (12, 20), wherein said lighting system includes a light guide (1; 22) including an area (2; 26) into which the light produced by at least one light source (4) is injected, said injection area (2; 26) is extended by an area (8; 24) for extracting the light propagating inside the guide (1; 22) to light the display device (12; 20), said extraction area (12, 20) is provided with light extractors (10), the light guide (1; 22) takes the form of a loop closed on itself at the light injection area (2; 26) to allow the light originating from the light source (4) and which was not extracted from the light guide (1; 22) in the extraction area (8; 24) to continue to travel inside the light guide (1; 22) and to return to the starting point thereof at the light injection area (2; 26), the data display device (12; 20) is arranged inside the loop, and the lighting system is characterized in that the light is extracted from the light guide (1; 22) in a perpendicular direction to a plane (P1) defined by the direction (X-X) of injection of light into the guide (1), and by a generating line (Y-Y) of the loop.

7 Claims, 2 Drawing Sheets

LIGHTING SYSTEM FOR A DATA DISPLAY DEVICE INCLUDING A LIGHT GUIDE

This application claims priority from European Patent Application No. 10164825.1 filed Jun. 3, 2010, the entire disclosure of which is incorporated herein by reference.

FIELD OF THE INVENTION

The present invention concerns a lighting system for a data display device including a light guide. More specifically, the present invention concerns a light extraction device with a system for recycling unused light to light a data display device.

BACKGROUND OF THE INVENTION

The description below relates in particular to the front lighting of a display device such as a reflective liquid crystal display cell. This technique is known as "front light illumination".

A known technique for the front light illumination of a reflective type display device consists in arranging a transparent light guide, inside which light is injected, above the display device. The light guide is structured to allow gradual extraction of the light that is propagating in the direction of the underlying display device. The structures provided in the light guide for extracting the light are called "light extractors". The number, geometry and distribution of these extractors inside the light guide vary in accordance with the application thereof.

It is an arduous task to select a given type of light extractor which can provide a good level of illumination without adversely affecting the display contrast of the data provided by the display device. Indeed, for mainly aesthetic reasons which are easily understood, these light extractors must, in particular, be as little visible as possible to the user and able to ensure the most uniform possible lighting over the entire surface of the display device. This latter condition is especially important for the illumination of a display device that is integrated in a wristwatch.

The first problem which arises with the front light illumination of a reflective display device by means of a light guide and which adversely affects illumination uniformity is linked to the actual operating principle of a light guide of this type. Where the luminous flux or luminous power injected by a light source at the light guide inlet is called $P_0$ and assuming that the guide has a light extraction efficiency per unit of length E, the internal luminous flux remaining inside the light guide according to the distance z travelled by the light inside the guide is given by the formula $P_0 e^{-E \cdot z}$. Consequently, the luminous flux $P_{extr}(z)$ that can be extracted from the guide at a given point z on the length of the guide is proportional to the internal luminous flux in accordance with the relation:

$$P_{extr}(z) \propto P_0 e^{-E \cdot z} \quad (1)$$

The above equation (1) shows that if the light extraction efficiency E remains the same over the entire length of the light guide, the luminous flux $P_{extr}(z)$ extracted from the guide decreases exponentially with the distance from the point of injection of light into the guide. Consequently, the illumination of the display device will not be uniform over the entire surface thereof.

To overcome this problem, a first solution might consist in creating a light guide whose light extraction efficiency varies with the distance from the point of injection of light into the guide. More specifically, the light extraction efficiency of the guide would have to increase progressively away from the point of injection of light into the guide. This solution is, however, difficult to implement. By definition, the light extraction efficiency always remains less than 1. Consequently, the extraction efficiency cannot increase indefinitely with the distance from the point of injection of light into the guide. Further, to obtain a continuous variation in light extraction efficiency along the guide, the geometry or depth of the light extractors in the guide would have to be continuously altered, which would require considerable effort in terms of the design and fabrication of the light guide.

Another solution for compensating for the exponential decrease in the luminous flux extracted from the light guide could consist in providing a guide having constant and very low (i.e. much lower than 1) light extraction efficiency along the entire length of the guide. In such case, equation (1) above could be approximated as follows:

$$P_{extr}(z) \propto P_0 e^{-E \cdot z} \approx P_0(1-E \cdot z) \approx P_0 \quad (2)$$

Equation (2) above shows that with constant and very low light extraction efficiency, the luminous flux extracted from the light guide is substantially the same over the entire length of the guide and is equal to the luminous flux injected into the guide inlet. In practice, this solution is much easier to achieve since it does not require varying the geometry of the extractors along the guide. Indeed, the light extraction efficiency must the same over the entire length of the optical guide. However, this second solution also raises a problem. Indeed, to be verified, equation (2) above requires the light extraction efficiency to be very low. In other words, only a small part of the luminous flux initially injected into the light guide is really used for lighting the reflective display device. The rest of the luminous flux injected into the light guide will be expelled or absorbed once it reaches the outlet of the guide and therefore lost forever. Consequently, the optical output ratio of this type of system is mediocre.

To overcome this problem, one could envisage arranging a mirror at the light guide outlet so as to re-inject into the guide any light that escapes therefrom. This solution is not however very appropriate for the type of light guide with which we are concerned here. Indeed, once reflected back inside the guide, the light propagates in an opposite direction to the initial direction of propagation in the guide and no longer interacts with the extractors in the same way, since the latter generally have an asymmetrical structure which is optimised for extracting light originating directly from the source arranged at the guide inlet. Any light propagating in the opposite direction will not therefore be extracted or diffused in an optimum manner and will adversely affect the display contrast of the display device.

It is an object of the present invention to overcome the aforementioned drawbacks in addition to others by providing a light guide having improved an optical output ratio.

SUMMARY OF THE INVENTION

The present invention therefore concerns a lighting system for a data display device, wherein said lighting system includes a light guide having one area into which the light produced by at least one light source is injected, said injection area is extended by an area for extracting the light propagating inside the guide to illuminate the display device, said extraction area is provided with light extractors, the light guide takes the form of a loop closed onto itself at the light injection area, the data display device is arranged inside the loop, and the lighting system is characterized in that the light is extracted from the light guide along a perpendicular direction to a plane defined by the direction of injection of light into the guide and by a generatrix or generating line of the loop.

The lighting system for a data display device includes a light guide wherein the light that is not extracted at the extraction area to light the data display device continues on its path inside the light guide and returns to its starting point at the light injection area. Thus, any light not used in the extraction area is recycled and re-injected into the light guide in the same direction of propagation as the initially injected light and therefore interacts with the light extractors in an optimum manner, owing to which the coupling of the light in the guide is improved and most of the light recovered in the extraction area is reused. The illumination of the data display device is therefore homogeneous over the entire surface thereof and much more luminous than with the solutions of the prior art.

Another advantage of the invention lies in the fact that the light injected into the light guide is extracted from the guide in a perpendicular direction to a plane defined by the direction of injection of light into the guide and by a generatrix of the loop. Thus, if the data display device is of the reflective type, the data display device is illuminated from above, i.e. from the side where the data is displayed, whereas the light source is arranged underneath the display device. A very compact lighting system is thus obtained in which the data display device is enveloped in the light guide. Moreover, since the light source is arranged underneath the lighting device, the halo produced by the light source, known as a "hot spot", is invisible to the user.

Conversely, if the data display device is of the transmissive type, the display device, enveloped in the light guide, will be illuminated from below. In this case too, the resulting lighting system is very compact. The high degree of versatility of the lighting system according to the invention is also observed. With a few modifications the lighting system is capable of lighting homogeneously and intensely both reflective display devices and transmissive display devices.

BRIEF DESCRIPTION OF THE DRAWINGS

Other features and advantages of the present invention will appear more clearly upon reading the following detailed description of one embodiment of the lighting system according to the invention, this example being given solely by way of non-limiting illustration with reference to the annexed drawing, in which.

The light guide disclosed in the present patent application is in the shape of a loop and consequently allows any light which has not been extracted from the guide in an extraction area to be returned to the light injection area of the light guide. The light guide thus includes a light injection area extended by a light extraction area which closes on the injection area. Thus, any light not used in the extraction area of the guide is re-injected into the injection area which is extended by a transmission area that returns the unused light to the extraction area. The light re-injected into the light guide thus propagates in the same direction as the initially injected light, such that the efficiency of the extractors in the extraction area with respect to the re-injected light is identical to the efficiency of said extractors with respect to the light initially injected by the light source. The data display device is illuminated homogeneously and more intensely over the entire surface thereof. According to the invention, the light that propagates inside the light guide is extracted from the guide in a perpendicular direction to a plane defined by the direction in which light is injected into the guide and by a generatrix of the loop-shaped light guide. Owing to these features, the data display device, enveloped in the light guide, may, with a few minor alterations, be either illuminated from above if it is a reflective guide, or from below if it is a transmissive guide. Further, the invention provides a very compact lighting system.

DETAILED DESCRIPTION OF THE PREFERRED EMBODIMENTS

The present invention will be described in relation to a reflective data display device, i.e. a device requiring front lighting. More specifically, the present invention will be described in relation to a reflective liquid crystal display device. It goes without saying, however, that the present invention applies in a similar manner to a transmissive data display device.

Figure 1:
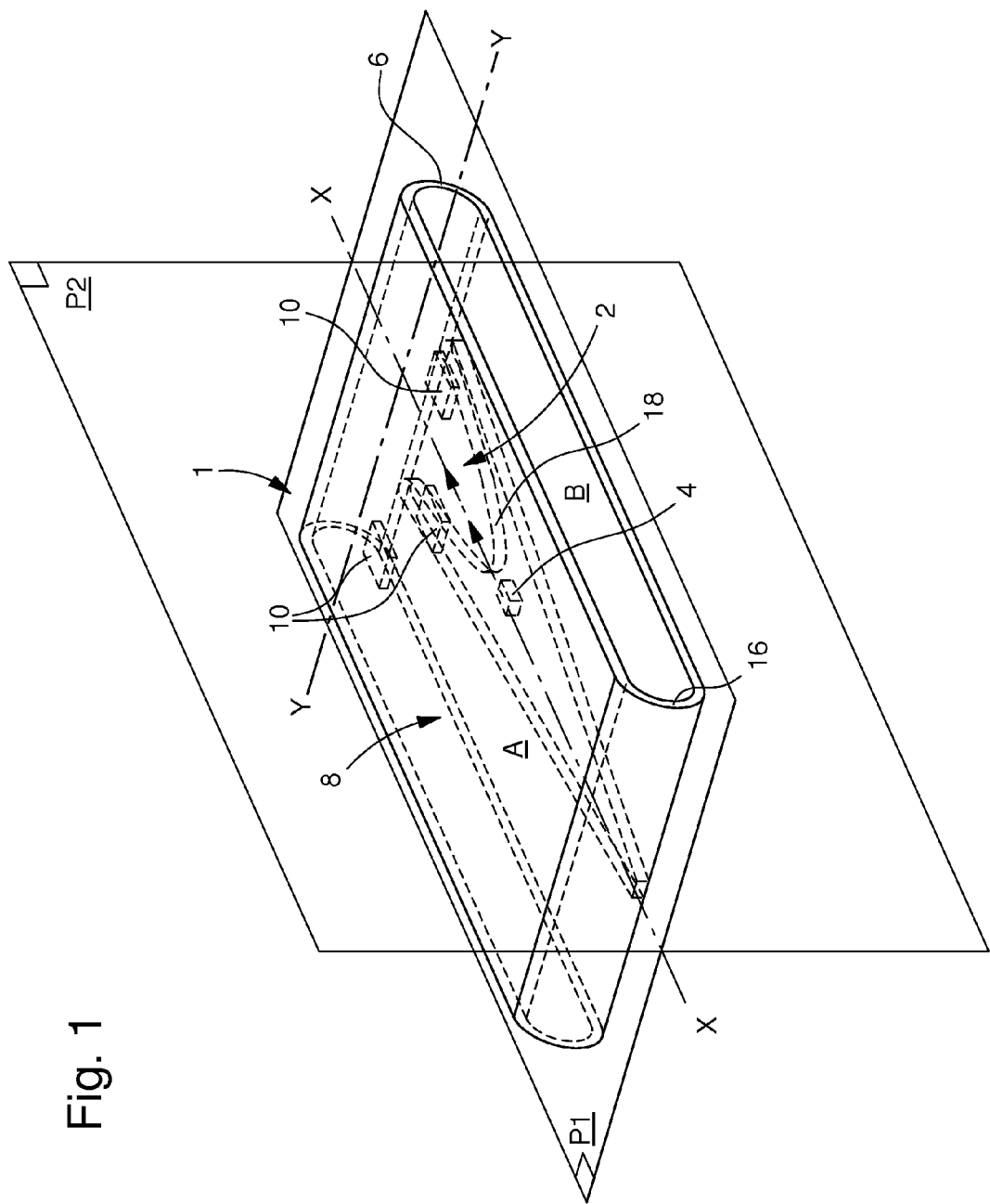
FIG. 1 is a perspective view of a light guide according to the present invention.

The light guide according to the invention is shown in perspective in FIG. 1. Designated as a whole by the general reference numeral 1, this light guide generally takes the form of a loop closed on itself. It includes a light injection area 2 facing which there is arranged a light source 4. Any type of light source such as a filament bulb or a light emitting diode may be used within the scope of the present invention. The light is injected into light guide 1 in a substantially rectilinear direction X-X.

Figure 2:
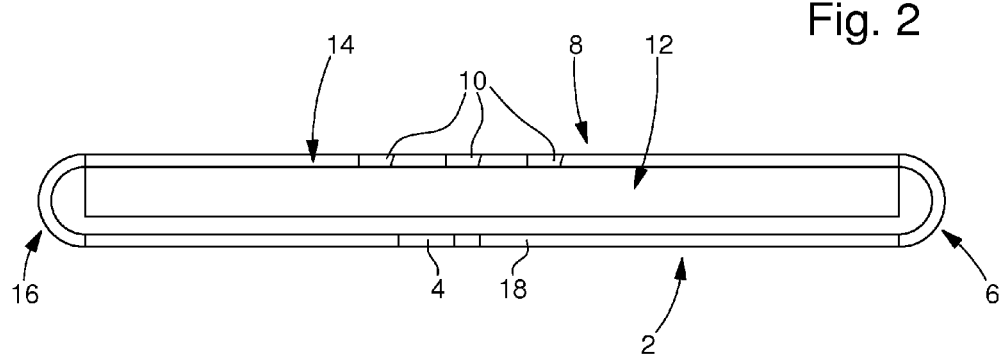
FIG. 2 is a cross-section of the complete lighting system according to the invention with the introduction of a reflective data display device inside the loop formed by the light guide.

The light injection area 2 is extended, via a first semi-cylindrical transmission area 6, by a light extraction area 8. This light extraction area 8 is provided with a plurality of optical extractors 10 for extracting light from light guide 1 and directing it towards the surface of a reflective data display device 12, such as a liquid crystal cell. As FIG. 2 shows, reflective display device 12 is slid inside and enveloped by the loop formed by light guide 1. Of course, the data display surface 14 of display device 12 is oriented towards light extraction area 8 of light guide 1.

Light extraction area 8 is in turn extended by a second semi-cylindrical transmission area 16, which is connected to light injection area 2. Thus, the light originating from light source 4 and which is not extracted from light guide 1 in extraction area 8 to light data display device 12 continues its path inside light guide 1 and returns to its starting point at light injection area 2. It will be clear that any light that is not used in extraction area 8 is re-injected into light guide 1 in the same direction of propagation as the light initially injected by light source 4 and therefore interacts in an optimum manner with light extractors 10, owing to which the coupling of the light in guide 1 is improved and most of the light recovered in extraction area 8 is reused. The illumination of the data display device 12 is therefore homogeneous over the entire surface thereof and much more luminous than with the solutions of the prior art. This result is achieved owing to the fact that the light is extracted from light guide 1 in a perpendicular direction to a plane P1 defined by the direction X-X of injection of light into guide 1, and by a generator Y-Y of one or other of the first and second semi-cylindrical transmission areas 6 and 16.

It will be noted that semi-cylindrical transmission area 16 is connected to light injection area 2 via two, substantially triangular connector sections A and B. This triangular shape allows a maximum surface area to be occupied between semi-cylindrical transmission area 16 and light injection area 2 without altering the parabolic profile of injection area 2. The triangular shape of the two connector sections A and B also allows some collimation of the light to be preserved so that the recycled light returns to light extraction area 8 in mostly parallel propagation directions to the median plane P2 of longitudinal symmetry of guide 1.

The optical behaviour of light guide 1 according to the invention has been studied using optical modelization and simulation tools. It was assumed that light guide 1 was, for example, made of glass, and had a constant thickness of 0.4 mm, over the entire length thereof. Of course, light guide 1 may be made of another transparent dielectric material such as a plastic material or polymethylmethacrylate or PMMA. The radius of curvature of the first and second semi-cylindrical transmission areas 6 and 16 was chosen to be equal to 0.95 mm. The simulated light source 4 is a light emitting diode having a similar luminous emission lobe to that of the light emitting diodes currently marketed by Kingbright. It will be noted that optical extractors 10 were not taken into account in this modelisation given that the desired object is to evaluate the behaviour of that part of the light which did not interact with the extractors.

The modelization of light guide 1 described above leads to the following results:
  70% higher light coupling in light guide 1 than the luminous flux initially provided by light emitting diode 4;
  up to 76% of the light that passes through extraction area 8 without being extracted from light guide 1 is recovered in injection area 2 and reused;

The above modelization also led to the observation that the luminous flux inside light guide 1 exhibited a good degree of parallelism with directions of propagation comprised within a maximum angle of 20°. As is visible in FIG. 1, the injection area 2 is of parabolic shape, with light source 4 placed opposite the apex 18 of the parabola. This configuration is such that most (around 80%) of the light injected by light source 4 into guide 1 undergoes total reflection inside guide 1 and cannot escape therefrom. Consequently, there is total light reflection at the interface between guide 1 and the ambient air. It is not, therefore, necessary to use artifices such as metallising the periphery of light guide 1 to ensure that light does not escape from the guide 1. Moreover, the effect of the parabolic shape of injection area 2 is to collimate the light beams emitted by light source 4 in parallel directions of propagation to the axis of symmetry of the parabola which merges with the direction of injection X-X of light into guide 1.

Figure 3:
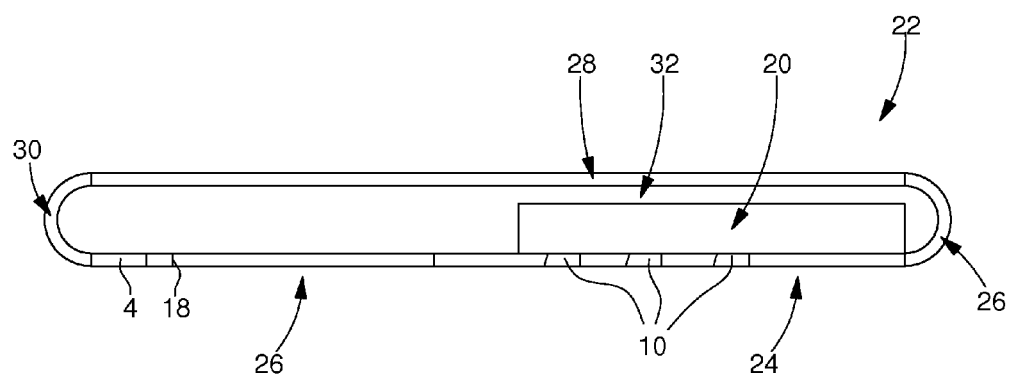
FIG. 3 is a similar view to that of FIG. 2, wherein the data display device is of the transmissive type.

It goes without saying that this invention is not limited to the embodiments that have just been described and that various simple alterations and variants can be envisaged by those skilled in the art without departing from the scope of the invention as defined by the claims annexed to this patent application. In particular, FIG. 3 is a perspective view of a variant of light guide 1 according to the invention. The case of FIG. 3 concerns a transmissive data display device 20. As can be seen upon examining the drawing, light guide 22 has the same geometry as light guide 1 illustrated in FIG. 2. However, in this case, light extraction area 24, arranged in the extension of light injection area 26 is located underneath the surface of display device 20, so as to back light said device. Extraction area 24 is then extended by a first semi-cylindrical transmission portion 26, which is in turn extended by a second flat transmission portion 28, which is closed on light injection area 26 via a third semi-cylindrical transmission portion 30. The first, second and third transmission portions 26, 28 and 30 are used solely to return any light that has not been used in extraction area 24 to injection area 26 so that said light can be re-injected into guide 22. It will be clear that the display surface 32 of data display device 20 is oriented upwards, opposite flat transmission portion 28.

What is claimed is:

1. A lighting system for a data display device, the lighting system comprising:
  (a) a data display device; and
  (b) a light guide, wherein the light guide includes
    (i) an injection area, wherein a light produced by at least one light source is injected into the injection area of the light guide;
    (ii) an extraction area, wherein the extraction area is an extended area of the injection area, wherein the extraction area is disposed to extract the light propagating inside the light guide to light the display device, and
  wherein the extraction area has light extractors,
  wherein the light extractors are disposed to
    (1) direct the extracted light towards a data display surface of the data display device when the data display device is of the reflective type and the data display surface is turned towards the extraction area; or
    (2) direct the extracted light towards a rear surface of the data display device opposed to a data display surface when the data display device is of the transmissive type and the rear surface of the data display device is turned towards the extraction area,
  wherein the light guide takes the form of a closed loop, wherein the loop is closed at the light injection area to allow the light originating from the light source that was not extracted from the light guide in the extraction area to continue to travel inside the light guide and to return to the starting point thereof at the light injection area,
  wherein the light guide is dimensioned so the data display device can be arranged inside the loop, and
  wherein the light is extracted from the light guide along a perpendicular direction to a plane defined by the direction of injection of light into the guide, and by a generatrix line of the loop.

2. The lighting system according to claim 1, wherein the light injection area is extended by the extraction area via a first semi-cylindrical transmission area, wherein the extraction area is extended in turn by a second semi-cylindrical transmission area that is connected to the injection area, and
  wherein the data display device is of the reflective type with the data display surface oriented towards the light extraction area of the light guide.

3. The lighting system according to claim 1, wherein the light extraction area is arranged in an extension of the light injection area and is extended by a first semi-cylindrical transmission portion that is in turn extended by a second flat transmission portion, wherein the second flat transmission portion is closed on the light injection area via a third semi-cylindrical transmission portion, wherein the first, second and third transmission portions are disposed to return the light that has not been used in the extraction area to the injection area for re-injection into the light guide, and
  wherein the data display device being of the transmissive type with the data display surface thereof oriented towards the flat transmission portion.

4. A lighting system for a data display device, the lighting system comprising:
  (a) a data display device; and
  (b) a light guide, wherein the light guide includes
    (i) an injection area, wherein the light produced by at least one light source is injected into the injection area of the light guide;

(ii) an extraction area, wherein the extraction area is an extended area of the injection area, wherein the extraction area is disposed to extract the light propagating inside the light guide to light the display device, and wherein the extraction area has light extractors, wherein the light guide takes the form of a closed loop, wherein the loop is closed at the light injection area to allow the light originating from the light source that was not extracted from the light guide in the extraction area to continue to travel inside the light guide and to return to the starting point thereof at the light injection area, wherein the data display device is arranged inside the loop, wherein the data display device is of the reflective type with the data display surface oriented towards the extraction area of the light guide, wherein the light is extracted from the light guide along a perpendicular direction to a plane defined by the direction of injection of light into the guide, and by a generatrix line of the loop, wherein the injection area is extended via a first semi-cylindrical transmission area, wherein the extraction area is extended in turn by a second semi-cylindrical transmission area that is connected to the injection area, and wherein the first semi-cylindrical transmission portion and the second semi-cylindrical transmission portion are connected to the light injection area by two, substantially triangular connector sections.

5. A lighting system for a data display device, the lighting system comprising:
   (a) a data display device; and
   (b) a light guide, wherein the light guide includes
      (i) an injection area, wherein the light produced by at least one light source is injected into the injection area of the light guide;
      (ii) an extraction area, wherein the extraction area is an extended area of the injection area, wherein the extraction area is disposed to extract the light propagating inside the light guide to light the display device, and wherein the extraction area has light extractors,
   wherein the light guide takes the form of a closed loop, wherein the loop is closed at the light injection area to allow the light originating from the light source that was not extracted from the light guide in the extraction area to continue to travel inside the light guide and to return to the starting point thereof at the light injection area,
   wherein the data display device is arranged inside the loop,
   wherein the light is extracted from the light guide along a perpendicular direction to a plane defined by the direction of injection of light into the guide, and by a generatrix line of the loop,
   wherein the light extraction area is arranged in an extension of the light injection area and is extended by a first semi-cylindrical transmission portion that is in turn extended by a second flat transmission portion, wherein the second flat transmission portion is closed on the light injection area via a third semi-cylindrical transmission portion,
   wherein the first, second and third transmission portions are disposed to return the light that has not been used in the extraction area to the injection area for re-injection into the light guide,
   wherein the data display device being of the transmissive type with the data display surface thereof oriented towards the flat transmission portion, and
   wherein the second flat transmission portion and the third semi-cylindrical transmission portion are connected to the light injection area by two, substantially triangular connector sections.

6. A lighting system for a data display device, the lighting system comprising:
   (a) a data display device; and
   (b) a light guide, wherein the light guide includes
      (i) an injection area, wherein a light produced by at least one light source is injected into the injection area of the light guide;
      (ii) an extraction area, wherein the extraction area is an extended area of the injection area, wherein the extraction area is disposed to extract the light propagating inside the light guide to light the display device, and wherein the extraction area has light extractors,
   wherein the light guide takes the form of a closed loop, wherein the loop is closed at the light injection area to allow the light originating from the light source that was not extracted from the light guide in the extraction area to continue to travel inside the light guide and to return to the starting point thereof at the light injection area,
   wherein the data display device is arranged inside the loop,
   wherein the light is extracted from the light guide along a perpendicular direction to a plane defined by the direction of injection of light into the guide, and by a generatrix line of the loop, and
   wherein the light guide is symmetrical relative to a longitudinal median plane.

7. A lighting system for a data display device, the lighting system comprising:
   (a) a data display device; and
   (b) a light guide, wherein the light guide includes
      (i) an injection area, wherein a light produced by at least one light source is injected into the injection area of the light guide;
      (ii) an extraction area, wherein the extraction area is an extended area of the injection area, wherein the extraction area is disposed to extract the light propagating inside the light guide to light the display device, and wherein the extraction area has light extractors,
   wherein the light guide takes the form of a closed loop, wherein the loop is closed at the light injection area to allow the light originating from the light source that was not extracted from the light guide in the extraction area to continue to travel inside the light guide and to return to the starting point thereof at the light injection area,
   wherein the data display device is arranged inside the loop, and
   wherein the light is extracted from the light guide along a perpendicular direction to a plane defined by the direction of injection of light into the guide, and by a generatrix line of the loop, and
   wherein the injection area has a parabolic profile.

* * * * *